US008775014B2

(12) United States Patent
Declety et al.

(10) Patent No.: US 8,775,014 B2
(45) Date of Patent: Jul. 8, 2014

(54) METHOD AND SYSTEM FOR CONSERVING OPERATING DATA OF A VEHICLE

(75) Inventors: Benjamin Declety, Paris (FR); Frédéric Heurtaux, Paris (FR); Gérard Pottier, Paris (FR); Patrick Valette, Paris (FR)

(73) Assignee: Sagem Defense Securite, Paris (FR)

( * ) Notice: Subject to any disclaimer, the term of this patent is extended or adjusted under 35 U.S.C. 154(b) by 135 days.

(21) Appl. No.: 13/302,163

(22) Filed: Nov. 22, 2011

(65) Prior Publication Data

US 2012/0130585 A1 May 24, 2012

(30) Foreign Application Priority Data

Nov. 22, 2010 (FR) .................................... 10 59608

(51) Int. Cl.
*G06F 11/30* (2006.01)

(52) U.S. Cl.
USPC ........ 701/31.7; 701/31.4; 701/29.1; 701/33.4

(58) Field of Classification Search
CPC ...................................................... G07C 5/085
USPC .......... 701/29.1, 29.7, 31.4, 31.5, 31.7, 33.4, 701/32.6, 32.7, 36
See application file for complete search history.

(56) References Cited

U.S. PATENT DOCUMENTS

| | | | | |
|---|---|---|---|---|
| 5,327,125 | A * | 7/1994 | Iwase et al. | 341/61 |
| 2003/0130771 | A1 | 7/2003 | Crank | |
| 2003/0135311 | A1 | 7/2003 | Levine | |
| 2004/0027255 | A1 | 2/2004 | Greenbaum | |
| 2012/0188105 | A1* | 7/2012 | Alkhalaf | 340/989 |

* cited by examiner

*Primary Examiner* — Gertrude Arthur Jeanglaude
(74) *Attorney, Agent, or Firm* — Muncy, Geissler, Olds & Lowe, P.C.

(57) ABSTRACT

A method of conserving operating data of a vehicle, the method including the steps of collecting the operating data and recording it progressively on board the vehicle, detecting an event, as from a detection, transmitting to at least one external receiver firstly at least some of the data that is being collected and as it is being collected, and secondly at least some of the stored data in a chronological order that is the reverse of the order in which it was recorded, and recording the data received by said external receiver. A conservation system for implementing the method is also provided.

18 Claims, 1 Drawing Sheet

METHOD AND SYSTEM FOR CONSERVING OPERATING DATA OF A VEHICLE

FIELD OF THE INVENTION

The present invention relates to a method and to a system for conserving operating data of a vehicle such as an aircraft.

BACKGROUND OF THE INVENTION

An aircraft generally carries an on-board system for conserving flight data. The flight data is conserved for the purpose of making it possible, in the event of the aircraft suffering an accident, to identify the causes of the accident.

That data comprises data from sensors such as sensors of navigation parameters, like speed and altitude, and of operating parameters relating to certain pieces of equipment, such as the engines.

Thus, for example, the data may include temperatures taken on the engines, data associated with cabin pressurization, attitudes of the airplane (roll, pitching, yaw), and its heading, . . . .

The data-conservation system generally comprises a processor unit known as a flight data acquisition unit (FDAU) connected to a network of sensors serving to collect data, and to a secure recorder module known as a flight data recorder (FDR).

The data that is conserved may also include voice data and more particularly the conversations of the crew. The conservation system then includes a processor unit connecting the cockpit microphones to a secure recorder module known as a cockpit voice recorder (CVR).

A secure recorder module comprises a reinforced housing and a locating beacon arranged to transmit a signal enabling the so-called "black box" to be identified and enabling its content to be read after the aircraft carrying the data-conservation system has suffered an accident, or indeed has broken up.

In spite of that, recovering secure recorder modules requires large amounts of equipment and human resources to be deployed, particularly when the aircraft has crashed at sea, and sometimes the secure recorder modules cannot be recovered.

SUMMARY OF THE INVENTION

An object of the invention is to provide simple and effective means for facilitating recovery of the operating data of a vehicle after the vehicle has suffered an accident.

To this end, the invention provides a method of conserving operating data of a vehicle, the method comprising the steps of:

- collecting the operating data and recording it progressively on board the vehicle;
- detecting an event;
- as from a detection, transmitting to at least one external receiver firstly at least some of the data that is being collected and as it is collected, and secondly at least some of the stored data in a chronological order that is the reverse of the order in which it was recorded; and
- recording the data received by said external receiver.

Thus, operating data that is being collected begins to be transmitted in real time progressively as it is processed and operating data that has already been recorded is transmitted in an order that is the reverse to the order to which it was recorded. This reverse order transmission serves to increase the chances of finding the cause behind the event, whereas transmission of data in real time provides the consequences of the event. The event in question may be a failure of the vehicle or an anomalous operation thereof, or it may be a command from an operator of the vehicle, as issued on becoming aware that there is a risk of losing control of the vehicle. In an airplane, the data may thus be collected before an accident occurs.

Preferably, the data comprises data of various types and the data is transmitted in a priority order that takes data type into account.

Since the length of time that is available for transmission and the data rate that is available can be relatively random, applying a hierarchy to the data serves to increase the chances of conserving the data that is, a priori, the most important. This hierarchy may be predefined, or it may be defined dynamically as a function of context.

Under such circumstances, and advantageously:

- airplane position data is transmitted at a high rate so as to make it more likely that complete recordings will be recovered for use in finding the wreck and the flight recorders, and this data has priority over other data. The data rate may be increased with decreasing altitude; and/or
- the data comprises first information relating to the validity of the data coming from a particular piece of equipment and second information relating to operation of said equipment, the first information having priority over the second information so long as the second information does not reveal a malfunction of said equipment; and/or
- the priority order is determined as a function of: the event itself; an operating stage of the vehicle at the moment the event is detected; or a characteristic of the telecommunications network(s) available for transmission; and/or
- a priority level is allocated to pieces of equipment constituting the sources of at least some of the data, depending on the proximity of those pieces of equipment and the cause of a triggering event. This proximity may be functional or it may be geometrical, or it may be a combination of both of these criteria. By way of example, in the event of an airplane in which airspeed data is detected as being erroneous, functional proximity involves giving priority in decreasing order as follows: all of the data from all of the airspeed sensors; then the data from sensors that provide similar data (inertial units, radio navigation, . . . ); then the data from the flight controls; and then the data from other pieces of equipment. Geometrical proximity gives priority pieces of equipment that are physically close to the piece(s) at the origin of the triggering event. For example, in the event of a problem on one of the engines of a four-engined jet airplane, priority is given to information coming from the adjacent engine, and to the control surfaces of the corresponding wing, over data concerning the control surfaces of the opposite wing.

The data that is transmitted going backwards in time is transmitted in the form of coherent packets and may run the gamut from a single measurement, to sequences of measurements (in natural order), e.g. sound samples, possibly compressed sound samples ("sound frames"). These packets are preferably transmitted with corresponding time stamps, either specifically in the form of times, or in the form of sample acquisition numbers, or a combination of both.

Furthermore, similar priorities are also applicable to the data that is transmitted in real time. The order of priority allocated to the data that is transmitted in real time may be different from that allocated to the recorded data: for example, in an airplane having its cockpit fitted with a video device, this may serve to include a few images of the cockpit as a function of available bandwidth.

Finally, priorities of the same type may also be allocated to “preflight” elements that are not available on the ground, such as data concerning the center of gravity of the airplane after balancing its fuel tanks, images of the passenger cabin at the time of takeoff . . . .

By means of these various priorities allocated to the various kinds of data available on board and potentially capable of helping understand the causes of any accident as well as possible, best use is made of the available passband for transmitting the data to the receiver in order to optimize the chances of being able to carry out an analysis that is conclusive in the event of usable on-board recorders not being recovered.

When the airplane has a plurality of links capable of transmitting the data in parallel (e.g. two different satellite systems, or one satellite communications system and another communications system with the ground), it is also possible to transmit the most important parameters (e.g. airplane position) in redundant manner over a plurality of those communications links, while sharing the remainder of the stream over the various available links as a function of their reliability. Thus, priority may be given to transmitting sequential data over the most reliable links and transmitting voluminous data (images, video) over links that are less reliable but of greater bandwidth.

The invention also provides a system for conserving operating data of a vehicle, the system comprising a data processor unit connected to a data collection network and to a secure recorder module, wherein the processor unit is also connected to a memory having a transmitter unit connected thereto in order to transmit stored data out from the vehicle, the processor unit being programmed to send the data for recording to the secure recorder module and to the memory, the transmitter unit being arranged to transmit at least some of the data that is being collected progressively as it is being sent to the memory and also at least some of the stored data in an order that is the reverse of the order in which it was stored.

BRIEF DESCRIPTION OF THE DRAWINGS

Other characteristics and advantages of the invention appear on reading the following description of particular, non-limiting embodiments of the invention.

Reference is made to the accompanying drawing, in which.

DETAILED DESCRIPTION OF THE PREFERRED EMBODIMENTS

Figure 1:
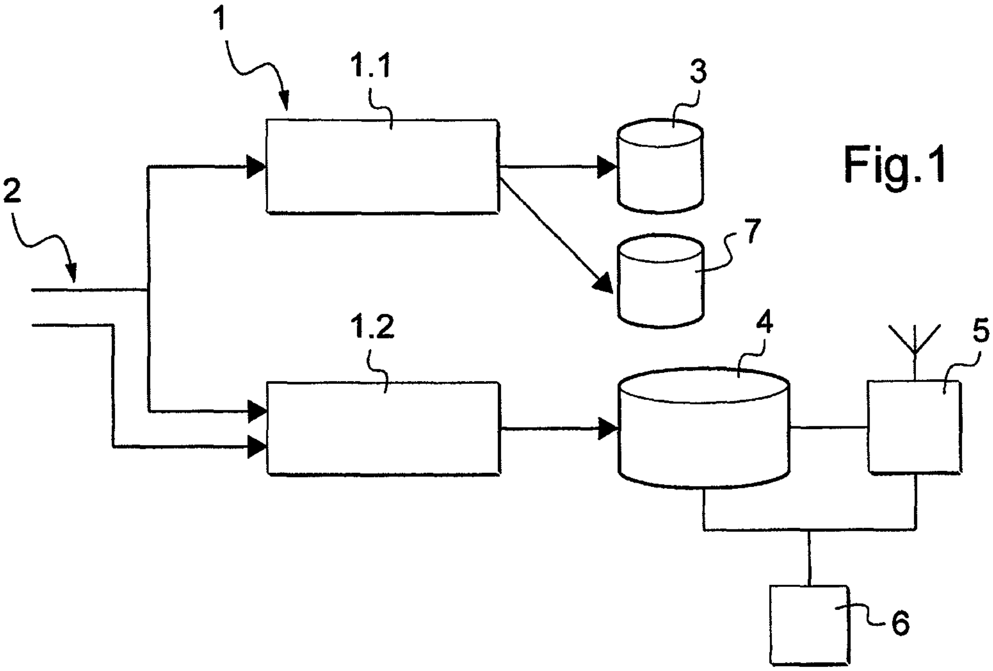
FIG. 1 is a diagrammatic view of a system in a first embodiment of the invention.

With reference to the figures, the data-conservation system described herein is for an airplane. Naturally the invention can be used with any type of vehicle, whether for use on land, at sea, or in the air, and whether or not it carries people on board. The invention as implemented in the first and second embodiments is described with reference to conserving data from sensors such as the navigation parameters and engine operation parameters. The invention in these embodiments is naturally usable for conserving voice data, such as crew conversations, as in the third embodiment.

The data conservation system in accordance with the invention comprises in known manner a data processor unit, generally referenced 1 in the figures, connected to a data collection network 2 and to a secure recorder module 3 of the type known as an FDR, a digital flight data recorder (DFDR), or a solid state flight data recorder (SSFDR). The secure recorder module 3 is designed to be mounted in the tail of the airplane. The processor unit 1 is a computer unit acting as an acquisition computer and incorporating at least one processor executing a program for processing and managing data including the data to be recorded, calculating data values for recording, and causing the data and the data values to be recorded in the secure recorder module. The way in which data is collected, the network, and the sensors used are conventional and they are not described herein. The secure recorder module 3 is likewise of conventional structure, and here it makes use of solid state memory of the flash type.

The processor unit 1 is also connected to a memory 4 having a transmitter unit 5 connected thereto for transmitting the stored data out from the vehicle. The processor unit 1 is also programmed to send the data for recording to the secure recorder module 3 and to the memory 4. The memory 4 and the transmitter unit 5 are connected to at least one emergency battery 6 serving to power them in the event of the on-board electricity network failing.

The transmitter unit 5 is a radio transmitter programmed to transmit:

- firstly all or some of the data that is being collected progressively as it is sent to the memory 4; and
- secondly all or some of the data stored in the memory 4 in an order opposite to the order in which it was stored.

The conservation system is arranged to implement a data conservation method comprising the steps of:

- collecting flight data and recording it progressively on board the vehicle;
- detecting an event;
- starting from a detection, transmitting to at least one external receiver firstly the data that is being collected and as it is being collected and secondly the stored data in a chronological order that is the reverse of the order in which it was recorded; and
- recording the received data.

The detected event is here either a failure of a piece of equipment of the vehicle or a command from an operator of the airplane, or else the detection of anomalous behavior of the vehicle. A failure may be total (breakdown), or else it may comprise degraded performance or some other early-warning indicator that is capable of revealing that there is a danger of a severe breakdown occurring shortly. By way of example, the failure may be detected from test messages sent by each piece of equipment over the data collection network. These built-in test equipment (BITE) messages serve to verify that a piece of equipment is operating properly and they trigger the conservation method if they relate to pieces of equipment that are critical, such as the engines or the computer of the airplane, and/or if they are representative of a failure presenting a level of severity that is greater than a threshold. The failure may also be detected by means of early-warning signs such as a rise in the temperature or in the level of vibration in the engines. In an airplane, anomalous behavior of the vehicle may, for example, correspond to a nose-down angle or a rate of turn that is excessive, where the thresholds are a function of altitude.

The transmitter unit 5 is programmed to transmit in real time over a first transmission channel the data being collected progressively as it is being sent to the memory, and over a second channel, the stored data in an order opposite to the order in which it was stored. These channels may optionally use the same physical media (frequency, coding).

The transited data comprises data of various types such as flight parameters, operating parameters of pieces of equipment of the airplane, so-called "status" messages serving to verify the validity of the data coming from the equipment, and the above-mentioned BITE test messages, together with any other data that might be of use in explaining an accident. The processor unit 1 is arranged to allocate a priority order to the data by taking data type into account. Thus, for some particular piece of equipment, the status data indicating that the data supplied by the equipment is valid has priority over the test data relating to the operation of the equipment, so long as the test data does not reveal any malfunction of said piece of equipment (it is of use to know that a piece of equipment is faulty even if the data coming therefrom is considered as being valid). The priority order is also determined as a function of:

- the event that caused the conservation method to be put into operation (if the event is failure of a piece of equipment, the data relating to that equipment has priority);
- an operating stage of the vehicle at the moment the event was detected (the data does not have the same importance depending on whether the airplane is taking off, cruising, or landing); and
- characteristics of the telecommunications network(s) available for transmission, and for example a data rate characteristic that governs the quantity of data that can be sent.

Data transmission is performed as a function of the allocated priority.

The data is transmitted in frames associated with implicit time information (e.g. given by a frame number or a known time interval between frames) or explicit time information (e.g. a time-and-date stamp). When the data is voice data, the frames are those coming from the voice encoder (VOCODER) type coding member incorporated in the data acquisition line.

The receiver preferably belongs to a trusted third-party organization that conserves the data sent by the transmitter member 5 in an appropriate memory. When the airplane reaches its destination, corresponding information is sent to the trusted third-party organization which then deletes the data from memory. The transmitted data may be sent directly to the receiver or may pass in transit via one or more relays before reaching the receiver. By way of example, a relay may be a satellite, a neighboring vehicle such as another airplane cruising in the vicinity of the airplane in difficulty, or a stationary terrestrial relay.

The method preferably includes a step of encrypting the data before it is transmitted, in particular when the data includes crew conversations. The decryption code is provided to the trusted third-party organization only in the event of the airplane suffering an accident.

The programming of the processor unit 1 also prevents data transmission being deactivated before the airplane reaches its destination or before the airplane reaches some predetermined operating stage, here the parking stage.

In the first embodiment shown in FIG. 1, the processor unit 1 comprises a first processor module 1.1 of the FDAU type and the second processor module 1.2 is of the data management unit (DMU) type, which modules are independent of each other, with both of them being connected to the data collection network 2. The processor module 1.1 executes an aviation-certified processing program for verifying the compatibility between the input data and the output data, while the processor module 1.2 executes a processing program that is not certified. The processor modules 1.1 and 1.2 may receive the same data, but the processor module 1.2 preferably receives additional data.

The first processor module 1.1 is connected to the secure recorder module 3 and in this embodiment to a quick access recorder (QAR) or memory 7. By way of example, the memory 7 is a magnetic medium, a magneto-optical disk, or a memory card, e.g. of the PCMCIA (for Personal Computer Memory Card International Association) type.

The second processor module 1.2 is connected to the memory 4 which here constitutes the direct access recorder (DAR). The processor module 1.2 is configured to enable both reading of data from the memory 4 (to enable data to be transmitted in an order that is the reverse of the order in which it was stored) and also writing of data into the memory 4 (to continue recording data).

Elements that are identical or analogous to those described above are given the same numerical references in the second and third embodiments.

Figure 2:
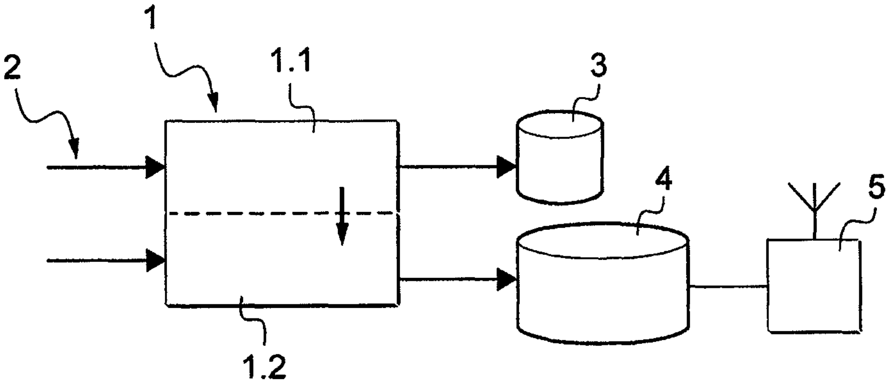
FIG. 2 is a diagrammatic view of a system in a second embodiment.

In the second embodiment of FIG. 2, the processor unit 1 is of unitary structure comprising a portion 1.1 performing the FDAU function and a portion 1.2 performing the DMU function. The portion 1.1 is connected to the secure recorder module 3 and the portion 1.2 is connected to the DAR-forming memory 4. The portion 1.1 also sends data to the portion 1.2 so that the data is recorded in the memory 4.

Figure 3:
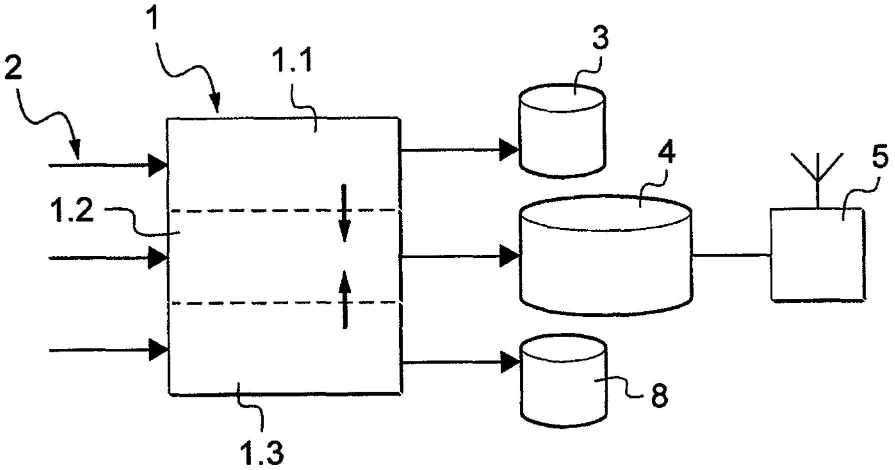
FIG. 3 is a diagrammatic view of a system in a third embodiment.

In the third embodiment of FIG. 3, the processor unit 1 has a unitary structure comprising a portion 1.1 performing the FDAU function and a portion 1.2 performing the DMU function as in the second embodiment, and it also incorporates a portion 1.3 that processes voice data. The portion 1.1 is connected to the secure recorder module 3; the portion 1.2 is connected to the DAR-forming memory 4; and the portion 1.3 has an input connected to the voice data acquisition line and an output connected to the secure recorder module 8 for recording voice data and to the DAR-forming memory 4. The portions 1.1 and 1.3 also send data to the portion 1.2 so that the data is recorded in the memory 4.

Naturally, the invention is not limited to the embodiments described and covers any variant coming within the scope of the invention as defined by the claims.

In particular, the structure of the data conservation system may be different from that described and may for example comprise solely an FDAU-forming processor unit connected to the secure recorder module 3 and to the QAR-forming memory 7. The transmitter unit 5 is then connected directly to the memory 7, which needs to be arranged to perform both writing and reading of data.

The transmitter unit may also be connected directly to the processor unit 1 in order to receive directly the data for recording and to the memory in order to read the recorded data.

The portions 1.1 and/or 1.3 may be connected directly to the memory 4 in order to record data directly therein. The memory 4 is then advantageously associated with a processor managing access to said memory.

Data transmission may be performed over a single channel or over a plurality of channels in parallel. For example, it is possible to envisage using a VHF or UHF type radio channel and a satellite channel. The data transmitted over the two channels may be the same data in order to benefit from redundancy, or different data in order to give priority to sending data of a certain type over one of the channels that has the reputation of being more reliable or that presents a bandwidth that is greater. Furthermore, certain attitudes of the aircraft may impede the use of a satellite channel such that it is preferable to make use of a VHF channel.

What is claimed is:

1. A method of conserving operating data of a vehicle, the method comprising the steps of:

collecting the operating data and recording it progressively on board the vehicle;

detecting an event;

as from a detection, transmitting to at least one external receiver firstly at least some of the data that is being collected and as it is being collected, and secondly at least some of the stored data in a chronological order that is the reverse of the order in which it was recorded; and recording the data received by said external receiver.

2. The method according to claim 1, wherein the event is a failure of a piece of equipment of the vehicle or an early-warning sign of such a failure.

3. The method according to claim 1, wherein the event is a command from an operator of the vehicle.

4. The method according to claim 1, wherein the data comprises data of various types and the data is transmitted in a priority order that takes data type into account.

5. The method according to claim 4, wherein the data comprises first information relating to the validity of the data coming from a particular piece of equipment and second information relating to operation of said equipment, the first information having priority over the second information so long as the second information does not reveal a malfunction of said equipment.

6. The method according to claim 4, wherein the priority order is determined as a function of the event itself; an operating stage of the vehicle at the moment the event is detected; or a characteristic of the telecommunications network(s) available for transmission.

7. The method according to claim 1, wherein the collected and transmitted data includes sounds date, voice data, or images.

8. The method according to claim 1, wherein the transmitted data passes via at least one relay before reaching the receiver.

9. The method according to claim 1, wherein the relay is one of the following elements: a satellite; a nearby vehicle; a stationary terrestrial relay.

10. The method according to claim 1, wherein the receiver is a trusted third-party organization.

11. The method according to claim 1, wherein data transmission cannot be deactivated before the vehicle has reached its destination or before a predetermined operating stage of the vehicle.

12. The method according to claim 1, including the step of encrypting the data before transmitting it.

13. The method according to claim 1, wherein the data is transmitted in frames in association with time information.

14. A system for conserving operation data of a vehicle, the system comprising a data processor unit connected to a data collection network and to a secure recorder module, wherein the processor unit is also connected to a memory having a transmitter unit connected thereto in order to transmit stored data out from the vehicle, the processor unit being programmed to send the data for recording to the secure recorder module and to the memory, the transmitter unit being arranged to transmit at least some of the data that is being collected progressively as it is being sent to the memory and also at least some of the stored data in an order that is the reverse of the order in which it was stored.

15. The system according to claim 14, wherein the processor unit comprises a first processor module and a second processor module that are independent from each other and that are both connected to the data collection network, the first processor module being connected to the secure recorder module and the second processor module being connected to the memory.

16. The system according to claim 14, wherein the amount of data sent to the memory is greater than the amount of data sent to the secure recorder module.

17. The system according to claim 14, wherein the memory and the transmitter unit are associated with at least one emergency battery.

18. The system according to claim 14, wherein the transmitter unit is programmed to transmit the data that is being collected progressively as it is being sent to the memory in real time over a first transmission channel, and the stored data in an order that is the reverse of the order in which it was stored over a second channel.

* * * * *